(12) United States Patent  (10) Patent No.: US 7,494,067 B1
Zhu  (45) Date of Patent: Feb. 24, 2009

(54) ALTERNATE AUTHORIZATION FOR PROXIMITY CARD

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 441 days.

(21) Appl. No.: 11/221,172

(22) Filed: Sep. 7, 2005

(51) Int. Cl.
G06K 19/06 (2006.01)
G06K 19/00 (2006.01)
G06K 7/00 (2006.01)

(52) U.S. Cl. .................. 235/492; 235/487; 235/435
(58) Field of Classification Search .............. 235/487, 235/492, 493, 435, 449, 451
See application file for complete search history.

(56) References Cited

U.S. PATENT DOCUMENTS

| | | | |
|---|---|---|---|
| 5,682,417 A * | 10/1997 | Nitta | 455/560 |
| 6,729,550 B2 * | 5/2004 | Seita et al. | 235/492 |
| 6,957,339 B2 * | 10/2005 | Shinzaki | 713/186 |
| 7,069,001 B2 * | 6/2006 | Rupp et al. | 455/411 |
| 7,341,182 B2 * | 3/2008 | Lai et al. | 235/380 |
| 2001/0005682 A1 * | 6/2001 | Terao et al. | 455/550 |
| 2001/0005840 A1 * | 6/2001 | Verkama | 705/67 |
| 2001/0034707 A1 * | 10/2001 | Sakaguchi | 705/44 |
| 2002/0017561 A1 * | 2/2002 | Tomoike | 235/383 |
| 2002/0029342 A1 * | 3/2002 | Keech | 713/184 |
| 2002/0045457 A1 * | 4/2002 | Taniguchi | 455/463 |
| 2002/0052192 A1 * | 5/2002 | Yamazaki et al. | 455/411 |
| 2002/0083000 A1 * | 6/2002 | Kawai | 705/51 |
| 2002/0107745 A1 * | 8/2002 | Loeser | 705/21 |
| 2002/0123967 A1 * | 9/2002 | Wang | 705/51 |
| 2002/0132585 A1 * | 9/2002 | Palermo et al. | 455/41 |
| 2002/0147913 A1 * | 10/2002 | Lun Yip | 713/184 |
| 2002/0153424 A1 * | 10/2002 | Li | 235/492 |
| 2002/0169001 A1 * | 11/2002 | Itazawa | 455/557 |
| 2004/0004117 A1 * | 1/2004 | Suzuki | 235/380 |
| 2004/0049454 A1 * | 3/2004 | Kanno et al. | 705/39 |
| 2004/0064406 A1 * | 4/2004 | Yates et al. | 705/40 |
| 2004/0072592 A1 * | 4/2004 | Hasegawa | 455/558 |
| 2004/0117302 A1 * | 6/2004 | Weichert et al. | 705/40 |
| 2004/0169637 A1 * | 9/2004 | Sato | 345/156 |
| 2005/0033994 A1 * | 2/2005 | Suzuki | 713/202 |
| 2005/0086171 A1 * | 4/2005 | Abe et al. | 705/51 |
| 2005/0087603 A1 * | 4/2005 | Koenck et al. | 235/472.02 |
| 2005/0113070 A1 * | 5/2005 | Okabe | 455/411 |
| 2005/0127167 A1 * | 6/2005 | Nakajima | 235/380 |
| 2005/0278222 A1 * | 12/2005 | Nortrup | 705/17 |
| 2006/0003776 A1 * | 1/2006 | Natori et al. | 455/456.3 |
| 2006/0019678 A1 * | 1/2006 | Itoh et al. | 455/456.4 |

(Continued)

OTHER PUBLICATIONS

"Payments software enabling the purchase of premium servicesTM—Case studies: Japan," Jan. 10, 2005, 3 pgs.

(Continued)

*Primary Examiner*—Daniel Walsh

(57) ABSTRACT

A mobile device is provided. The mobile device comprises a card operable to validate an authentication input based on a stored authentication value and to provide financial information to an external point-of-sale system when the authentication input validates successfully. The mobile device further comprises a mobile application operable to promote the card operating in one of two operation modes. In the first operation mode, the card receives the authentication input via a component of the external point-of-sale system. In the second operation mode, the card receives the authentication input via a component of the mobile device.

17 Claims, 3 Drawing Sheets

U.S. PATENT DOCUMENTS

| | | | |
|---|---|---|---|
| 2006/0025110 A1* | 2/2006 | Liu | 455/411 |
| 2006/0035624 A1* | 2/2006 | Yokoshi et al. | 455/410 |
| 2006/0043172 A1* | 3/2006 | Ho et al. | 235/380 |
| 2006/0080232 A1* | 4/2006 | Epps | 705/39 |
| 2006/0091200 A1* | 5/2006 | Lai et al. | 235/380 |
| 2006/0122902 A1* | 6/2006 | Petrov et al. | 705/26 |
| 2007/0152035 A1* | 7/2007 | Adams et al. | 235/380 |
| 2007/0189532 A1* | 8/2007 | Onozu et al. | 380/247 |
| 2007/0203792 A1* | 8/2007 | Rao | 705/14 |
| 2007/0228160 A1* | 10/2007 | Takayanagi | 235/380 |
| 2007/0235519 A1* | 10/2007 | Jang et al. | 235/379 |
| 2007/0278291 A1* | 12/2007 | Rans et al. | 235/380 |
| 2008/0046366 A1* | 2/2008 | Bemmel et al. | 705/44 |

OTHER PUBLICATIONS

"Smart Cards: The Future of Electronic Payments," A White Paper, VeriFone, 2000, 18 pgs.

Savage, Terry, "New Visa card gives parents teen control," Chicago Sun-Times, Aug. 29, 2002, 2 pgs.

Orbiscom Introduces ControlpayTM For Authorized User Solution—New Payment Solution Lifts The Barriers To Increased Card Usage Among Teens And Young Adults By Offering Parents Enhanced Control, Convenience And Peace Of Mind; Solution Also Supports MasterCard®'s Family AccountTM Initiative, Apr. 9, 2003, 2 pgs.

Zhu, Weiwen, "Over-the-Air Card Provisioning System and Method," Filing Date—Dec. 23, 2003, U.S. Appl. No. 10/744,169, Specification (41 pgs) and Drawings (10 sheets).

Zhu, Kevin, "Context-Based Card Selection Device," Filing Date—Jul. 28, 2004, U.S. Appl. No. 10/901,630, Specification (22 pgs) and Drawings (2 sheets).

White, Brian H., "Mobile Payment Authorization System and Method," Filing Date—May 26, 2005, U.S. Appl. No. 11/138,563, Specification (34 pgs) and Drawings (10 sheets).

* cited by examiner

ALTERNATE AUTHORIZATION FOR PROXIMITY CARD

CROSS-REFERENCE TO RELATED APPLICATIONS

This application includes subject matter related to U.S. patent application Ser. No. 11/138,563, entitled "Mobile Payment Authorization System and Method," filed May 26, 2005, by Brian H. White, et al, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to contactless card technology, and more particularly, but not by way of limitation, to an alternate authorization system and method for proximity cards.

BACKGROUND OF THE INVENTION

A point-of-sale (POS) terminal or station may receive payment information associated with a purchase and seek authorization for payment from a back-end financial system, for example a credit card authorization service. The point-of-sale terminal may receive the financial information from a contactless card. A contactless card communicates with a point-of-sale terminal or other device at least in part without physically contacting the point-of-sale terminal, for example through radio frequency communication conducted in the proximity of the point-of-sale terminal. Some contactless cards may have an on-board battery that provides power to the contactless card's electronic components and communication interface, for example to an antenna. Other contactless cards have no on-board power source but capture energy from a power source co-located with the point-of-sale terminal, for example from an electromagnetic field, and use the captured energy to power the on-board electronics and communication interface.

SUMMARY OF THE INVENTION

A mobile device is provided. The mobile device comprises a card operable to validate an authentication input based on a stored authentication value and to provide financial information to an external point-of-sale system when the authentication input validates successfully. The mobile device further comprises a mobile application operable to promote the card operating in one of two operation modes. In the first operation mode, the card receives the authentication input via a component of the external point-of-sale system. In the second operation mode, the card receives the authentication input via a component of the mobile device.

A method of completing an electronic sale is also provided. The method comprises a mobile device receiving an authentication input from a first source in a first operation mode of the mobile device, the mobile device validating the authentication input based on a stored authentication value. The method further comprises, upon successful validation of the authentication input, the mobile device providing financial information to a first point-of-sale terminal using contactless communication to complete a first sale, configuring a second operation mode of the mobile device, the mobile device receiving an authentication input from a second source in the second operation mode of the mobile device, validating the authentication input based on the stored authentication value. The method further comprises, when the validating the authentication input succeeds, the mobile device providing financial information to a second point-of-sale terminal using contactless communication to complete a second sale.

A purchasing system is also provided. The purchasing system comprises a point-of-sale terminal operable to receive a payment information, the point-of-sale terminal having an input component operable for a user to provide an authentication input. The purchasing system also includes a mobile device operable to receive the authentication input from the input component of the point-of-sale terminal in a first operation mode and from an input component of the mobile device in a second operation mode, the mobile device further operable to validate the authentication input based on a stored authentication value and to provide the payment information to the point-of-sale terminal when the authentication validates successfully, the mobile device communicating with the point-of-sale terminal through contactless means.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
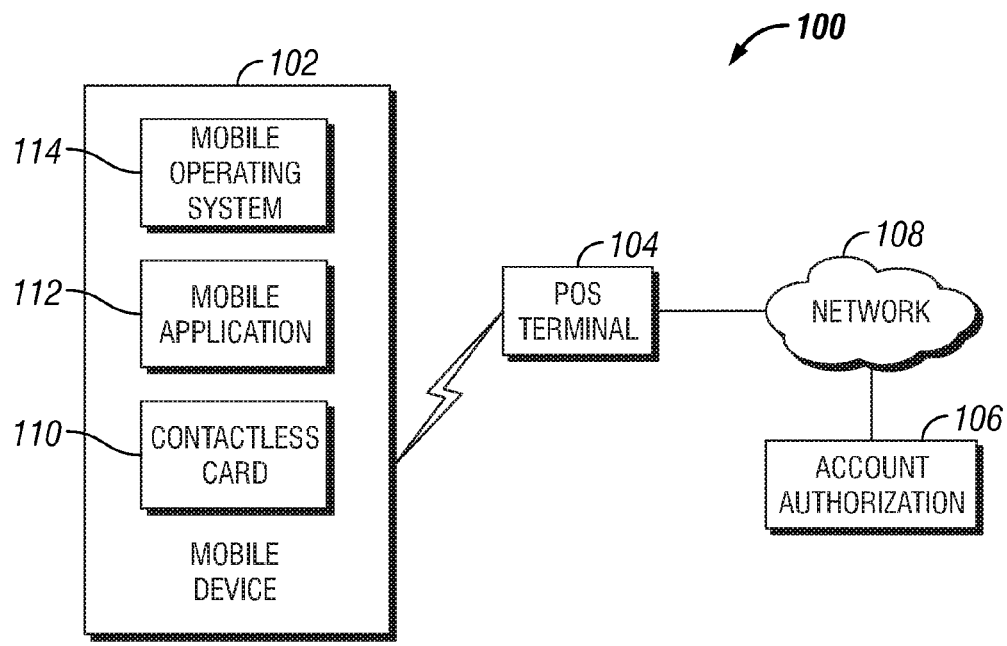
FIG. 1 is a block diagram of a mobile payment system according to an embodiment of the disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein._

Contactless cards might be used as a convenient, secure payment mechanism to facilitate purchases. In a typical transaction, a user might initiate a purchase by bringing a contactless card into the proximity of a point-of-sale (POS) terminal. Financial information, such as a credit card or debit card number, might then be transmitted from the contactless card to the POS terminal in order to complete the purchase.

Before the financial information is transmitted, it may be desirable to authenticate the user. That is, it should be confirmed that the possessor of the contactless card is allowed to use the contactless card and that the contactless card has not, for example, been stolen. This authentication might be done by the user providing identification information, such as a personal identification number (PIN). The identification information provided by the user can then be compared with identification information stored within the contactless card or elsewhere, such as, but not limited to, on a server managed by the issuer of the contactless card. If a match is found, the user can be considered authentic and the transaction can proceed.

In an embodiment, a mobile device uses an on-board contactless card to communicate with a POS terminal to complete a secure payment transaction. The contactless card can operate in either of two modes. Under typical, full-power operating conditions, the user might enter identification information into a keypad on the mobile device. A mobile application executing on the mobile device might receive the identification information from the keypad and transmit the information to the on-board contactless card. The contactless card might then validate the identification information provided by the user against identification information stored in the contactless card and inform the POS terminal whether or not the user has been authenticated.

If the mobile device were to lose power, however, data entry into the mobile device keypad may not be possible. In an embodiment, when the power level for the mobile device falls below a threshold, the mobile application configures the on-board contactless card for a depowered operation mode. The configuration consists of the mobile application informing the contactless card that the contactless card will no longer receive the user's identification information from the mobile application, but instead will receive the identification information from the POS terminal. That is, after the contactless card has been configured for the depowered mode, the user might enter identification information into the POS terminal by means of a keypad on the POS terminal or by similar means rather than entering the identification information into the keypad on the mobile device. The POS terminal might then transmit the identification information to the contactless card by standard contactless communication means. The contactless card might then validate the identification information in its usual manner and send the validation information to the POS terminal.

As described above, a contactless card with no on-board power source might be able to capture energy from the POS terminal and use the captured energy to power its on-board electronics and communication interface. Thus, the contactless card might be able to receive the user's identification information from the POS terminal, perform its normal authentication activities, and transmit authentication information back to the POS terminal when the mobile device has little or no battery power. Such a dual-mode mobile device may provide a better user experience, avoiding frustration when a user presents articles for purchase or lease only to find the mobile device is discharged and unable to complete the transaction due to a lack of power.

Turning now to FIG. 1, a block diagram of a mobile payment system 100 is depicted. The mobile payment system 100 includes a mobile device 102 that communicates payment information to a POS terminal 104. The POS terminal 104 communicates with an account authorization system 106 via a network 108 to obtain payment authorization. The mobile device 102 may be a mobile phone, a laptop computer, a personal data assistant, or other electronic device. In an embodiment, the mobile device 102 may comprise a contactless card 110, a mobile application 112, and a mobile operating system 114. In another embodiment, the mobile device 102 may not include a mobile operating system 114.

In a first operating mode, the mobile device 102 is depowered, and the contactless card 110 draws power from the POS terminal 104, for example capturing energy with an antenna from an electromagnetic field radiated by the POS terminal 104 or by another power source such as a cable, etc. The energy captured from the POS terminal 104 allows the contactless card 110 to perform its standard authentication activities and to transmit authentication information to the POS terminal 104. In a second operating mode, the mobile device 102 is conventionally powered from one or more batteries (not shown), and the contactless card draws power from the batteries.

In a typical purchasing transaction, the contactless card 110 validates the user by comparing identification information provided by the user, such as a PIN, a driver's license number, and/or a social security number, to stored identification information. The user might enter the identification information on a keypad (not shown) of the POS terminal 104. In an embodiment, the user may be prompted to provide biometric identification information and this biometric identification information is compared to stored biometric identification information. For example, a sensor may scan a fingerprint of the user and provide this for verification against a stored fingerprint scan.

In the first operating mode, the POS terminal 104 may exchange information with the contactless card 110 indicating that the POS terminal 104 may provide the identifying information. In an embodiment, the communication may take the form of a request from the POS terminal 104 to the contactless card 110 followed by a response from the contactless card 110 to the POS terminal 104. The POS terminal 104 may prompt the user to employ an interface provided by the POS terminal 104, for example a keypad or keyboard, to enter the identifying information. In an embodiment, the POS terminal 104 may provide a biometric sensor, for example a fingerprint scanner or other biometric scanner. The POS terminal 104 then relays the identifying information to the contactless card 110.

In the second operating mode, an interface of the mobile device 102, for example a keypad or a biometric sensor on the mobile device, for example a fingerprint scanner or other biometric sensor, may be employed by the user to provide the identifying information to the contactless card 110 via the mobile application 112. In the first operating mode, however, the mobile device 102 is without power and the mobile application 112 does not execute.

Figure 2:
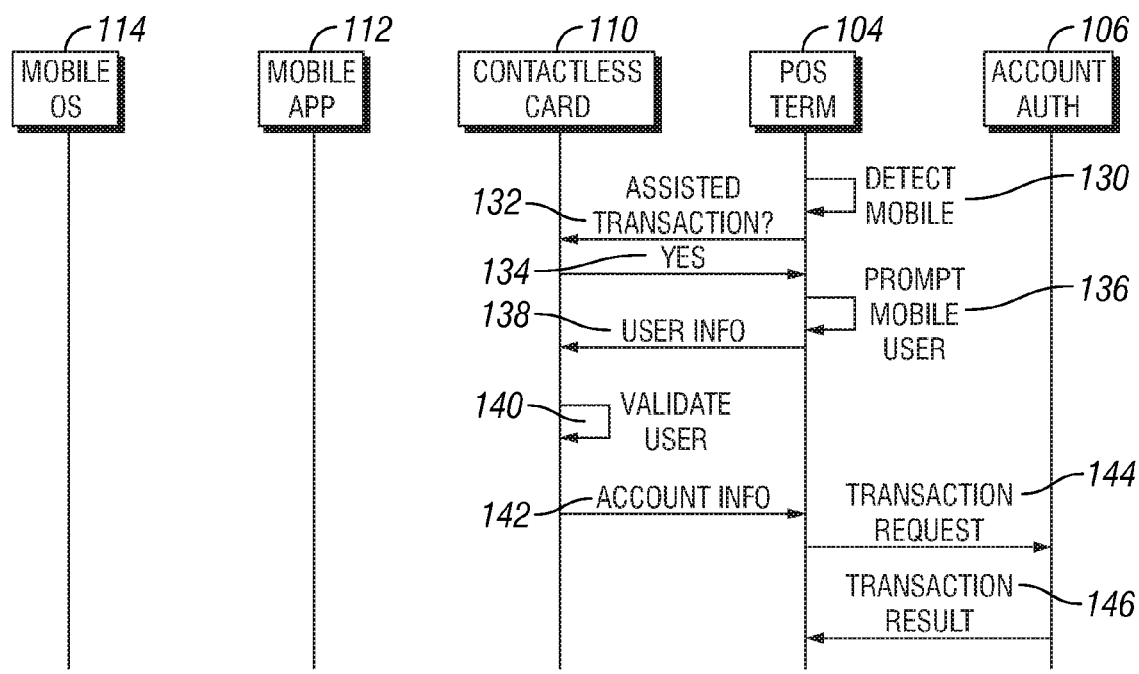
FIG. 2 is a message sequence diagram illustrating a payment transaction in a first operation mode according to an embodiment of the disclosure.

Turning now to FIG. 2, a message sequence diagram depicts an exemplary transaction using the mobile payment system 100 in the first operation mode. At label 130, the POS terminal 104 detects the proximity of the contactless card 110. At label 132 the POS terminal 104 sends an assisted transaction query message to the contactless card 110. If the mobile device 102 is depowered, as it is in the first operation mode, the contactless card 110 needs assistance from the POS terminal 104 for validation, and at label 134 the contactless card 110 sends a yes reply to the POS terminal 104. At label 136 the POS terminal 104 prompts the user to enter user identification information using an interface provided by the POS terminal 104. The user identification may include data that is entered using a keypad or keyboard and may be, for example, a driver's license number, a social security number, and/or a PIN. In an embodiment, the user identification may be biometric information sensed by an interface in communication with the POS terminal 104.

At label 138 the POS terminal 104 sends the user identification information to the contactless card 110. At label 140 the contactless card validates the user identification information by comparing it with a stored value of the user identification information. If the entered and stored user identification information match, at label 142 the contactless card 110 sends account information to the POS terminal 104. At label 144 the POS terminal 104 sends an account transaction request to the account authorization system 106. At label 146 the transaction is completed when the account authorization system 106 returns a transaction result, for example authorization to charge to a credit card account.

Figure 3:
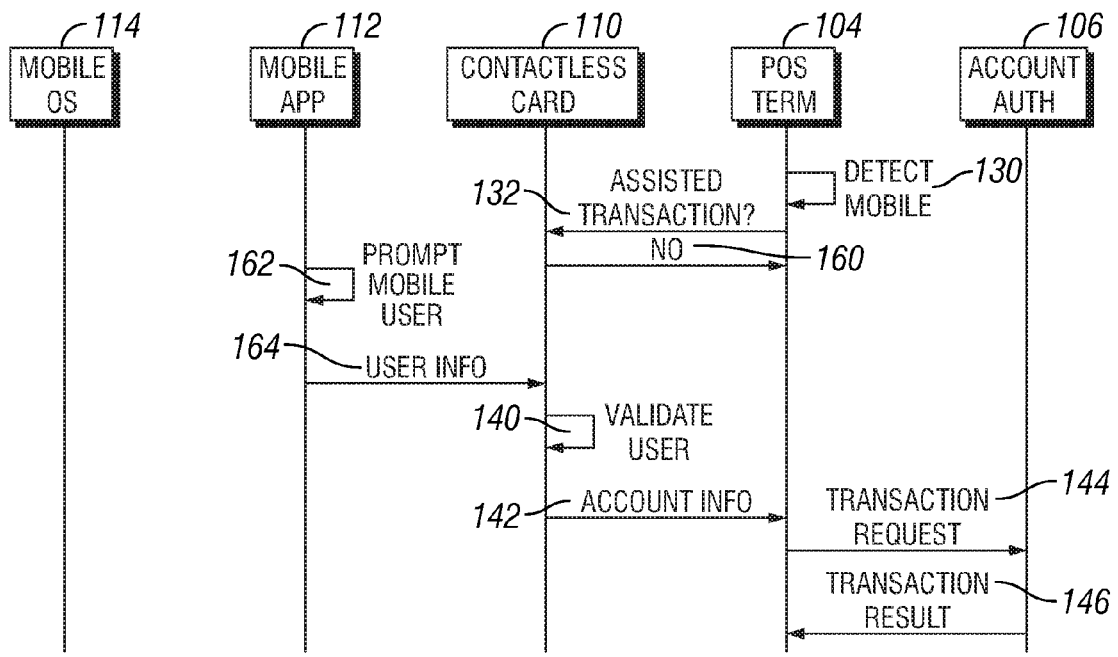
FIG. 3 is a message sequence diagram illustrating a payment transaction in a second operation mode according to an embodiment of the disclosure.

Turning now to FIG. 3, a message sequence diagram depicts an exemplary transaction using the mobile payment system 100 in the second operation mode wherein the mobile device 102 is powered. At label 130, the POS terminal 104 detects the proximity of the contactless card 110. At label 132 the POS terminal 104 sends an assisted transaction query message to the contactless card 110. If the mobile device 102 is powered, as it is in the second operation mode, the contactless card 110 does not need assistance from the POS terminal 104, and at label 160, the contactless card 110 sends a no reply to the POS terminal 104. At label 162 the mobile application 112 prompts the user to enter user identification information using an interface provided by mobile device 102. At label 164 the mobile application 112 sends the user identification information to the contactless card 110.

At label 140 the contactless card validates the user identification information by comparing it with a stored value of the user identification information. If the entered and stored user identification information match, at label 142 the contactless card 110 sends account information to the POS terminal 104. At label 144 the POS terminal 104 sends an account transaction request to the account authorization system 106. At label 146 the transaction is completed when the account authorization system 106 returns a transaction result, for example authorization to charge to a credit card account.

Figure 4:
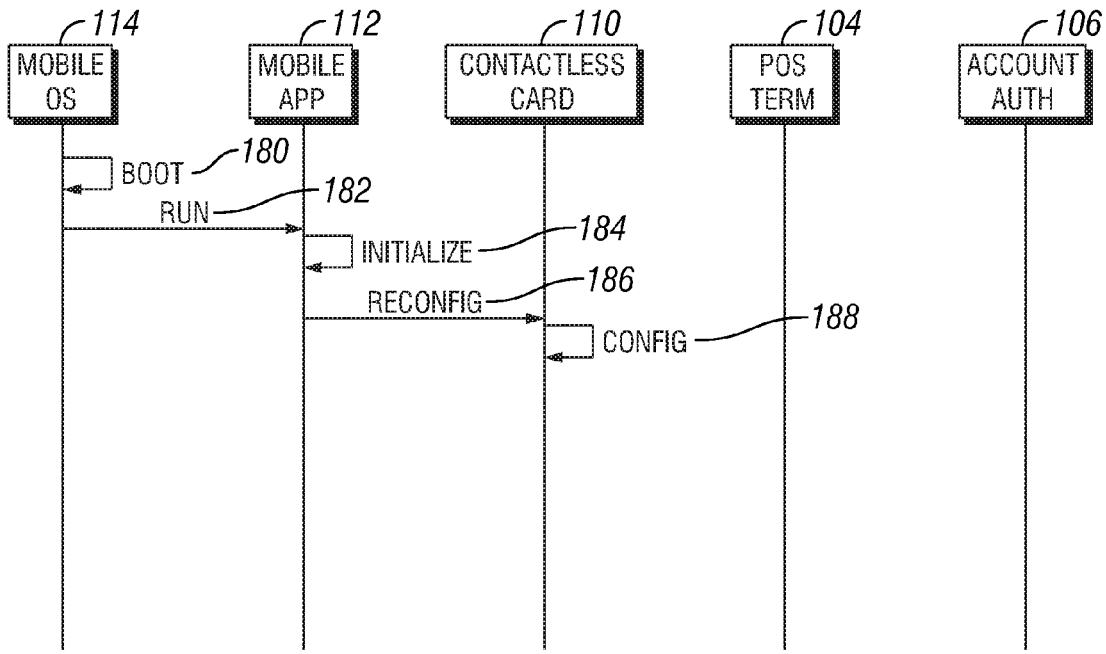
FIG. 4 is a message sequence diagram illustrating a power-on scenario of the mobile payment system according to an embodiment of the disclosure.

Turning now to FIG. 4, a message sequence diagram illustrates an exemplary power-on sequence. At label 180, the mobile operating system 114 begins executing or boots when the power level of the mobile device 102 raises sufficiently, for example as a result of recharging a battery of the mobile device 102. At label 182, the mobile operating system 114 runs or schedules for execution the mobile application 112. At label 184, the mobile application 112 initializes and runs. At label 186, the mobile application sends a reconfiguration message to the contactless card 110 instructing the contactless card 110 to configure itself for the second operation mode. At label 188, the contactless card 110 configures itself for the second operation mode.

Figure 5:
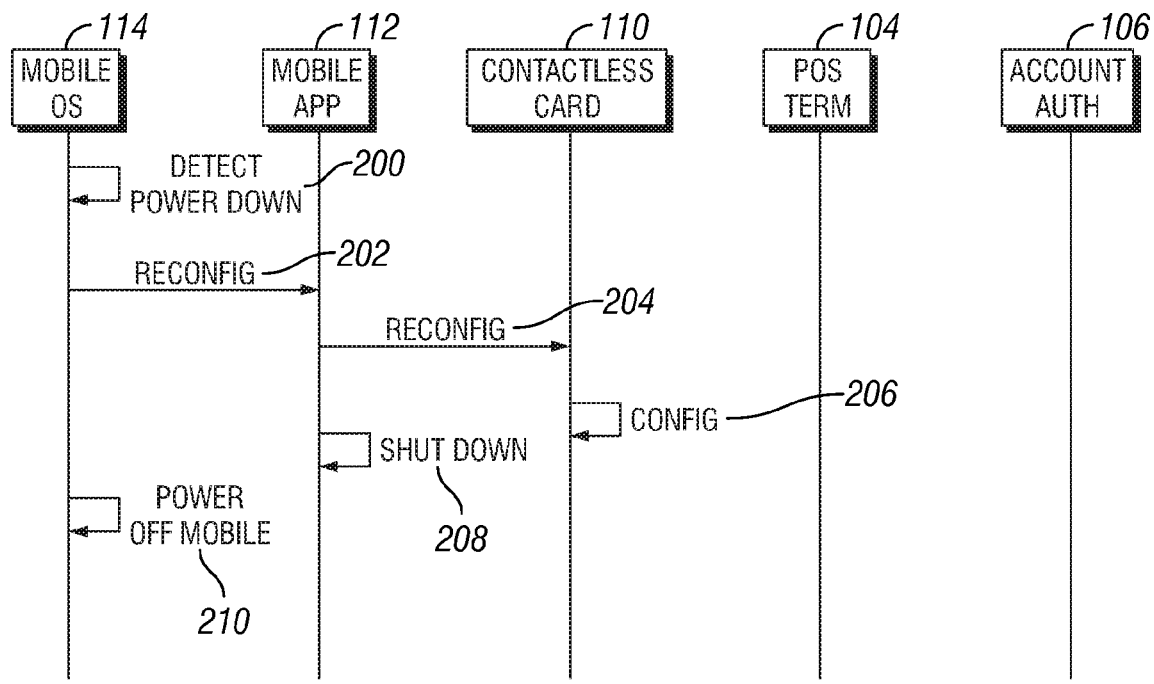
FIG. 5 is a message sequence diagram illustrating a power-off scenario of the mobile payment system according to an embodiment of the disclosure.

Turning now to FIG. 5, a message sequence diagram depicts an exemplary power-down sequence for the mobile payment system 100. At label 200, the mobile operating system 114 detects an impending low power condition, for example a battery energy level dropping below operational limits. At label 202, the mobile operating system 114 sends a reconfigure message to the mobile application 112. At label 204, the mobile application sends a reconfigure message to the contactless card 110. At label 206, the contactless card 110 reconfigures itself to the first operational mode. That is, the contactless card 110 makes the necessary adjustments that will allow it to accept a user's identification information from the POS terminal 104 rather than from the mobile application 112.

At label 208, the mobile application 112 optionally shuts down. At label 210, the mobile operating system 114 optionally shuts down. In another embodiment, the mobile application 112 and the mobile operating system 114 do not shut themselves off but just stop executing when power to the mobile device 102 fails. In either case, the mobile application 112 will have already informed the contactless card 110 that further inputs of user identification information will come from the POS terminal 104 rather than from the mobile application 112. Therefore, the mobile application 112 and the mobile operating system 114 can safely stop execution since no further communication between the mobile application 112 and the contactless card 110 will be necessary in this operating mode.

Figure 6:
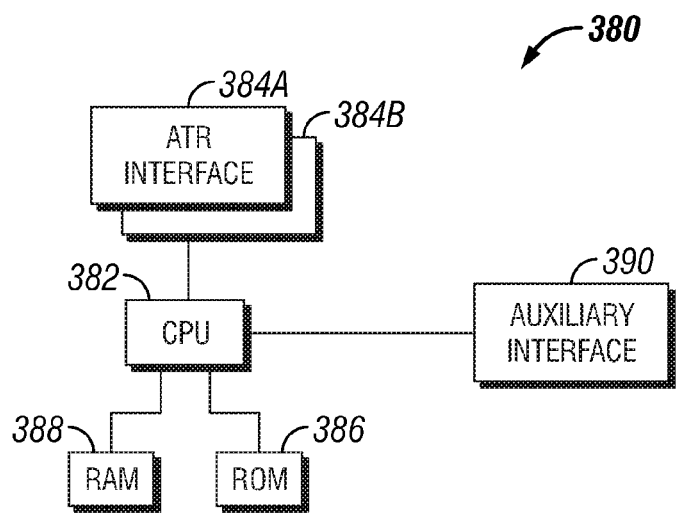
FIG. 6 illustrates an exemplary general purpose computer system suitable for implementing the several embodiments of the disclosure.

Some or various portions of the system described above may be implemented on any mobile computer platform with sufficient processing power, memory resources, and network throughput capability to handle the necessary workload placed upon it. FIG. 6 illustrates a typical mobile computer platform suitable for implementing one or more embodiments disclosed herein. The mobile computer platform 380 includes a processor 382 (which may be referred to as a central processor unit or CPU) that is in communication with one or more air interface components 384—for example a first air interface component 384*a* and a second air interface component 384*b*—memory devices including a read only memory (ROM) 386 and a random access memory (RAM) 388, and an optional auxiliary interface 390. The processor may be implemented as one or more CPU chips. Some or all of the mobile computer platform 380 may be implemented as a system-on-a-chip (SOC).

The air interface components 384*a*, 384*b* and the auxiliary interface provide radio communications with external radio devices. With such radio communications connectivity, it is contemplated that the processor 382 might receive information from a radio network, or might output information to the radio network in the course of performing the above-described method steps. Such information, which is often represented as a sequence of instructions to be executed using processor 382, may be received from and outputted to the radio network, for example, in the form of a computer data signal embodied in a carrier wave Such information, which may include data or instructions to be executed using processor 382 for example, may be received from and outputted to the radio network, for example, in the form of a computer data baseband signal or signal embodied in a carrier wave. The baseband signal or signal embodied in the carrier wave generated by the air interface components 384 may propagate in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The ROM 386 is used to store instructions and perhaps data which are read during program execution. ROM 386 is a non-volatile memory device which typically has a small memory capacity relative to the larger memory capacity of secondary storage.

The processor 382 executes instructions, codes, computer programs, firmware codes, and/or scripts which it accesses from the auxiliary interface 390, ROM 386, RAM 388, or the air interfaces 384. The auxiliary interface 390 may provide a special functionality to the mobile computer platform 380, for example contactless card functionality.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A mobile device, comprising:
a card operable to validate an authentication input based on a stored authentication value and to provide financial information to an external point-of-sale system when the authentication input validates successfully, the card operable in two unique operation modes and operating in one of the two unique operation modes, wherein, in a first operation mode, the card receives the authentication input via a component of the external point-of-sale system, and wherein, in a second operation mode, the card receives the authentication input via a component of the mobile device,
wherein a mobile application configures the card for the first operation mode when the mobile application is preparing to shut down and configures the card for the second operation mode when the mobile application is started.

2. The mobile device of claim 1, further including a mobile operating system, wherein the mobile operating system schedules the mobile application to be turned off when a mobile battery power is below a first threshold and wherein the mobile operating system starts the application when the mobile battery power raises above a second threshold.

3. The mobile device of claim 1, wherein the authentication input is selected from the group consisting of a personal identification number, a driver's license number, a biometric value, and a social security number.

4. The mobile device of claim 1, wherein the card receives power from an external source when in the first operation mode.

5. The mobile device of claim 1, further including a keypad operable to provide the authentication input to a mobile application when in the second operation mode.

6. The mobile device of claim 1, further including a biometric sensor operable to provide the authentication input to a mobile application when in the second operation mode.

7. A method of completing an electronic sale, comprising:
a mobile device receiving an authentication input from a first source in a first operation mode of the mobile device, wherein the first source is a component external to the mobile device;
the mobile device validating the authentication input from the first source based on a stored authentication value;
upon successful validation of the authentication input from the first source, the mobile device providing financial information to a first point-of-sale terminal using contactless communication to complete a first sale;
configuring a second operation mode of the mobile device, wherein the second operation mode is unique from the first operation mode;
the mobile device receiving an authentication input from a second source in the second operation mode of the mobile device, wherein the second source is a component of the mobile device;
validating the authentication input from the second source based on the stored authentication value;
when the validating the authentication input from the second source succeeds, the mobile device providing financial information to a second point-of-sale terminal using contactless communication to complete a second sale,
wherein the first operation mode is associated with a low battery condition of the mobile device,
detecting a low battery condition; and
configuring the first operation mode of the mobile device when a low battery condition is detected.

8. The method of claim 7, wherein the component external to the mobile device is the first point-of-sale terminal in the first operation mode.

9. The method of claim 7, wherein the authentication input is selected from the group consisting of a personal identification number, a driver's license number, a biometric value, and a social security number.

10. The method of claim 7, further including, in the first operation mode, requesting the point-of-sale terminal to promote providing the authentication input.

11. The method of claim 7, further including starting a mobile application that executes on the mobile device when battery power of the mobile device exceeds a threshold level and wherein the mobile application configures the second operation mode of the mobile device.

12. A purchasing system, comprising:
a point-of-sale terminal operable to receive a payment information, the point-of-sale terminal having an input component operable for a user to provide an authentication input; and
a mobile device operable in two unique operation modes to receive the authentication input, the mobile device receives the authentication input from the input component of the point-of-sale terminal in a first operation mode and from an input component of the mobile device in a second operation mode, the mobile device further operable to validate the authentication input based on a stored authentication value and to provide the payment information to the point-of-sale terminal when the authentication input validates successfully, the mobile device communicating with the point-of-sale terminal through contactless means, wherein the mobile device is operable in the first operation mode when a low battery condition of the mobile device is detected.

13. The purchasing system of claim 12, wherein the point-of-sale terminal is further operable to query the mobile device to determine if the first operation mode is active.

14. The purchasing system of claim 12, wherein the mobile device comprises:

a contactless card operable to communicate using contactless means with the point-of-sale terminal and to validate the authentication input; and a mobile application operable to receive the authentication input from the input component of the mobile device when the mobile device is in the second operation mode.

15. The purchasing system of claim 14, wherein the input component is selected from the group consisting of a keypad, a user interface, and a biometric sensor.

16. The purchasing system of claim 14, wherein the mobile application is further operable to configure the contactless card for the first and second operation modes.

17. The purchasing system of claim 12, wherein the point-of-sale terminal provides power to at least a portion of the mobile device in the first operation mode.

* * * * *